US007908629B2

(12) United States Patent
Lewis (10) Patent No.: US 7,908,629 B2
(45) Date of Patent: Mar. 15, 2011

(54) LOCATION-BASED IMAGE SHARING

(75) Inventor: Mark Lewis, La Grande, OR (US)

(73) Assignee: Intel Corporation, Santa Clara, CA (US)

( * ) Notice: Subject to any disclaimer, the term of this patent is extended or adjusted under 35 U.S.C. 154(b) by 615 days.

(21) Appl. No.: 09/892,553

(22) Filed: Jun. 28, 2001

(65) Prior Publication Data

US 2003/0004916 A1    Jan. 2, 2003

(51) Int. Cl.
 H04N 7/173 (2006.01)
 H04N 7/14 (2006.01)
 G06F 15/16 (2006.01)
(52) U.S. Cl. ............... 725/105; 709/203; 348/14.09
(58) Field of Classification Search .......... 725/105; 348/14.09, 159; 704/231; 370/352; 345/418; 707/200; 709/223, 217, 203; 358/442; 710/62
See application file for complete search history.

(56) References Cited

U.S. PATENT DOCUMENTS

| | | | | |
|---|---|---|---|---|
| 5,760,917 A * | 6/1998 | Sheridan | | 358/442 |
| 6,157,401 A * | 12/2000 | Wiryaman | | 348/14.09 |
| 6,167,469 A * | 12/2000 | Safai et al. | | 710/62 |
| 6,212,178 B1 * | 4/2001 | Beck et al. | | 370/352 |
| 6,230,197 B1 * | 5/2001 | Beck et al. | | 709/223 |
| 6,307,550 B1 * | 10/2001 | Chen et al. | | 345/418 |
| 6,323,897 B1 * | 11/2001 | Kogane et al. | | 348/159 |
| 6,389,460 B1 * | 5/2002 | Stewart et al. | | 709/217 |
| 6,567,775 B1 * | 5/2003 | Maali et al. | | 704/231 |
| 2002/0052885 A1 * | 5/2002 | Levy | | 707/200 |
| 2003/0004916 A1 * | 1/2003 | Lewis | | 707/1 |
| 2003/0078968 A1 * | 4/2003 | Needham et al. | | 709/204 |
| 2006/0167985 A1 * | 7/2006 | Albanese et al. | | 709/203 |

* cited by examiner

Primary Examiner — Gims S Philippe
(74) Attorney, Agent, or Firm — Joni Stutman (57) ABSTRACT

A method and system for image sharing based upon faces in an image is disclosed. The method for image sharing based upon faces in an image comprises defining a sharing rule defining with which one or more recipients images are shared based on face identifying information, and applying face identifying information associated with the image to the sharing rule to determine the one or more recipients with which the image should be shared. The system for image sharing based on faces in an image comprises a sharing rule defining with which one or more recipients images are shared based on face identifying information, and a sharing engine to apply face identifying information associated with an image to the sharing rule to determine the one or more recipients with which the image should be shared.

37 Claims, 4 Drawing Sheets

LOCATION-BASED IMAGE SHARING

BACKGROUND

1. Field of the Invention

This invention relates in general to the field of image sharing. Particularly, aspects of this invention pertain to image sharing based upon faces in an image.

2. General Background and Related Art

People love to share photos. Since we entered the new age of digital photos, sharing has become even more popular. Digital photos are made either with a digital camera or by scanning photos made by a traditional film camera. They are shared in various formats (e.g. Joint Photographic Experts Group format (JPEG), bitmap format (BMP), etc.). Digital photos are now sent as e-mail attachments, posted on Web sites, shared over instant messaging networks and on and on.

Sharing digital photos by e-mail is relatively simple. Most e-mail software applications provide the means to attach or embed digital photo files into an e-mail for display and/or saving by the recipient. The sender then simply sends the e-mail including the digital photo(s) to one or more desired recipients. In many circumstances, senders may establish one or more groups of recipients, e.g. members of a family or acquaintances and send a digital photo via e-mail to the group by identifying the group in the address of the e-mail. Sending such digital photo files by instant messaging networks is also easy since most, if not all, instant messaging software provides for sending and receiving computer files including digital photo files. As with e-mail, the sender identifies one or more recipients and sends the digital photo files to them. A sender can also identify a group of recipients.

Sharing digital photos through the Web can often be more complicated and involve interesting variations. In a typical scenario, the one or more digital photos are uploaded/downloaded to a Web site server by a user. The digital photos are integrated into the Web site and made available through the Web site server for browsing/downloading. These Web sites offer varying levels of security and control over who may add, delete, view and access the digital photos. Further, the user can configure the presentation of the one or more digital photos such as by enhancing (with, for example, captions or decorative backgrounds), laying out and categorizing the digital photos.

Many such Web sites also offer a user the ability to send an e-mail to one or more recipients containing a hyperlink to the one or more digital photos to be shared with those recipients. By clicking on the hyperlink in most conventional e-mail software applications, a recipient can be quickly directed to all or some of the digital photos on the Web site through the recipient's browser. In some cases, the recipient may need to provide authorization information to gain access to the digital photo(s) because the user may not wish to provide open access or wants to selectively present different digital photos to different users. Another variation on this theme involves sending not a link but the actual digital photo itself to the one or more recipients. In this manner, the user does not need to attach or embed the digital photo into an e-mail. The user simply needs to identify recipients (and typically their e-mail addresses) to the Web site and the Web site software generates and sends e-mails including the digital photo(s) to the intended recipients.

People also often enjoy sharing videos such as videos of the family trip or a newborn. As with digital still photos, sharing is particularly evident in the new age of digital videos whether these videos are made by traditional video cameras and then converted into digital videos or made with a digital video camera, and irrespective of the format (MPEG, AVI, etc.) of these digital videos. As with digital photos, digital videos are now sent as e-mail attachments, posted on Web sites whether for discrete download or for streaming, shared over instant messaging networks and on and on.

However, other than simply e-mailing or instant messaging digital photos/videos or links to digital photos/videos on a Web site to recipients whether individually or to one or more groups of recipients, there have not been many, if any, new and different sharing schemes for digital photos/videos. Indeed, past sharing schemes have suffered from being time consuming and awkward when manually selecting and sharing sometimes large collections of digital photos/videos.

In a system provided by ImageID Ltd., a person is issued an identification badge that the person wears. The system's software can then identify the badge in a photo of the person (assuming of course the photo shows the badge) and correspond that photo to the owner of the badge. The system then solely makes the photo available on a Web site for the identified badge owner to view and/or download. This system suffers a number of disadvantages including the need for the badge to show in the photo and the failure of the system to provide a means for sharing photos with others.

Accordingly, there is a need in the art for an improved, more automated solution to sharing images such as digital photos and/or videos. Therefore, it would be advantageous to provide a method and system for image sharing based upon faces in an image.

Exemplary embodiments of the invention are illustrated in the accompanying drawings in which like references indicate similar or corresponding elements and in which.

DETAILED DESCRIPTION

In an embodiment, a method for image sharing based upon faces in an image is provided. A sharing rule is provided. The sharing rule defines with which one or more recipients images are shared based on face identifying information. Face identifying information associated with the image is applied to the sharing rule to determine the one or more recipients with which the image should be shared. In another embodiment, there is provided a system for image sharing based on faces in an image. A sharing rule is provided. The sharing rule defines with which one or more recipients images are shared based on face identifying information. A sharing engine applies face identifying information associated with an image to the sharing rule to determine the one or more recipients with which the image should be shared. Furthermore, in another embodiment, there is provided a computer program product including computer program code to cause a processor to perform a method for image sharing based on a face in an image. The method comprises defining a sharing rule defining with which one or more recipients images are shared based on face identifying information. Face identifying information associated with the image is applied to the sharing rule to determine the one or more recipients with which the image should be shared. And in another embodiment, a computer program product including computer program code to cause a processor to perform a method of sharing an image having a face is provided. The method comprises analyzing the image to determine the face, associating face identifying information to the image corresponding to the determined face, determining a recipient of the image based upon the face identifying information, and making the image available to the recipient.

Figure 1:
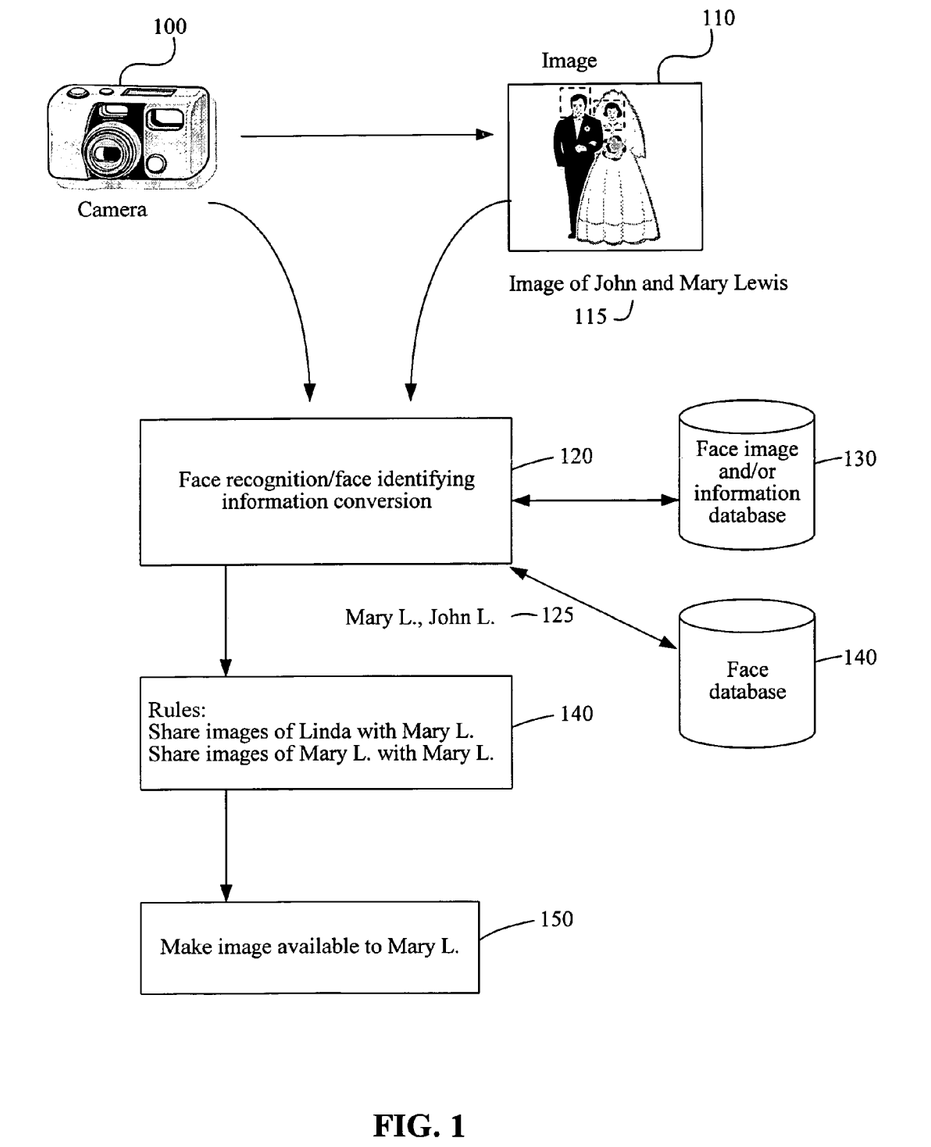
FIG. 1 is a high-level block diagram of an embodiment of the invention.
Figure 2A:
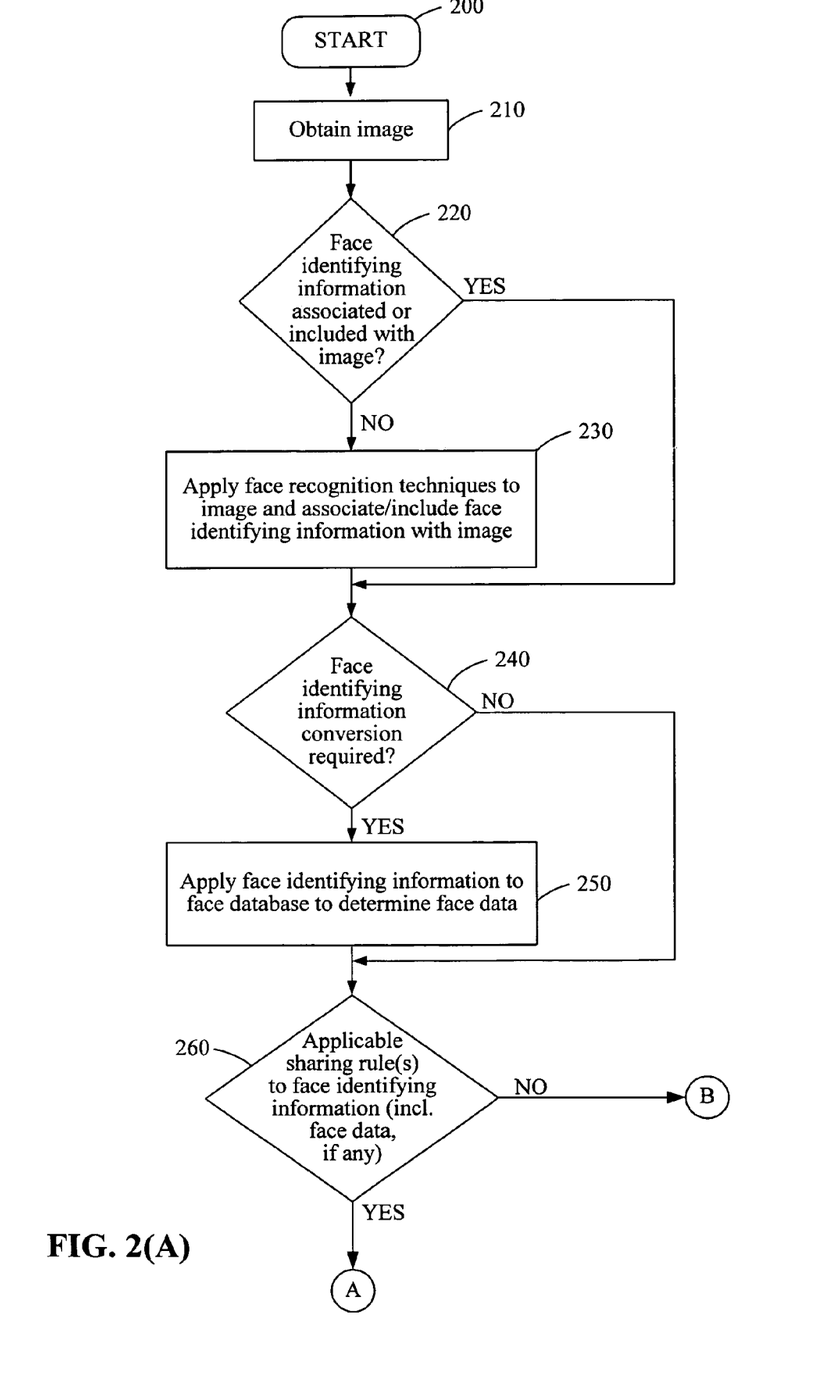
FIGS. 2(a) and 2(b) is a flow diagram illustrating a method for sharing of images based upon faces in an image according to an embodiment of the invention.
Figure 2B:
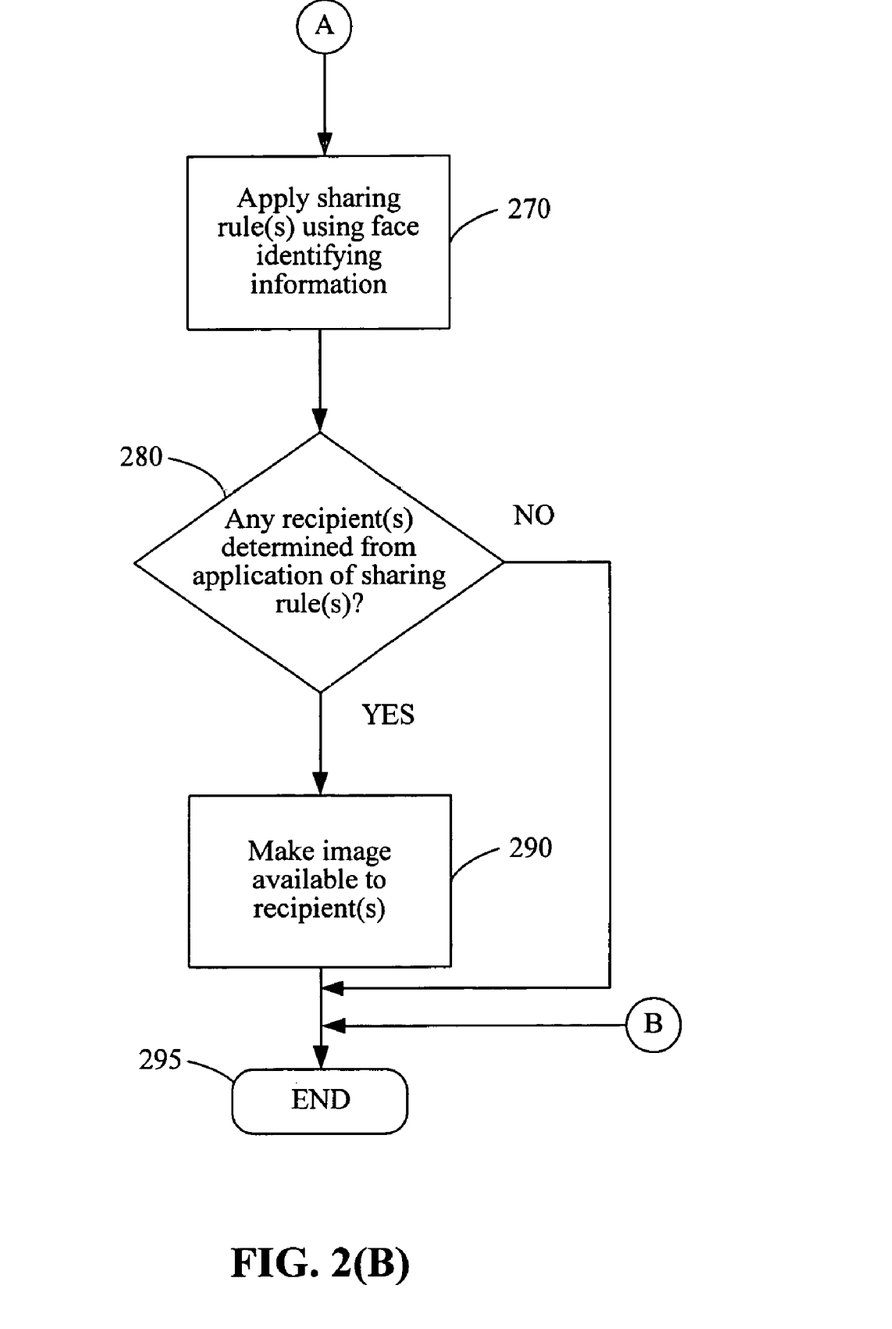

Referring to FIGS. 1 and 2, a camera 100 is used to obtain an image 110, 210 with which face identifying information 115 is associated. As will be apparent to those skilled in the art, a camera could be of various types including a traditional film camera, a digital photo camera, a traditional video camera, a digital video camera, etc. and the resulting image could be a digital photo and/or video or a traditional photo and/or video which is converted into a digital format (although as should be apparent to those in the art the image could be in any format provided it is capable of transmission over networks). In an example application of the invention, a digital camera generates a digital photo file.

Face identifying information may be associated with an image automatically or manually. In an embodiment, face recognition techniques known in the art are used 120 in conjunction with a database of face information 130, such as face images, to automatically determine faces and consequently persons shown in an image. For example, past images taken by a user and for which face identifying information has been determined can provide the source for the database of face information for future face recognition. Optionally, such a database could also include face information obtained from other sources such as commercially available databases of face information or face information provided by others e.g. face images sent by friends to the user. Having such a database of face information, an image can be analyzed to determine whether the face matches an image contained in the database or the face exhibits features specified by other face information contained in the database. Once the faces/persons in an image are determined by the face recognition techniques, face identifying information corresponding to the faces/persons shown in the image is associated with the image 230. In an embodiment, if face identifying information is not already associated with an image (for example, by manual association or inclusion as described hereafter) 220, the face recognition techniques discussed above are applied automatically to an image to determine face identifying information for the image. As used herein, associating the face identifying information with an image may instead or in addition be including the face identifying information in the image.

Face identifying information may also be manually associated with an image by a user identifying the faces/persons in the image. For example, a user may use input features of a digital camera to enter or specify face identifying information to be associated with an image already or to be taken by the digital camera and/or the user may use a computer system into which the image has been loaded to enter or specify face identifying information to be associated with the image. Such manual association or inclusion may be used in addition to or as a substitute for automatic association or inclusion of face identifying information.

Face identifying information can be of various types such as personal names, identification numbers, or any other face identifying information associated with an image. The face identifying information may also be associated with the image before, contemporaneously with, or after the image is taken and may be associated with the image in the camera or elsewhere such as on a computer system. Indeed, the image may be further processed by, for example, changing format, before or after the face identifying information is associated with the image.

Once an image with face identifying information is obtained, the face identifying information may need to be converted to or associated 120 with face data 125 such as a full or shortened personal name, an employee number, a nickname, etc. for application to one or more sharing rules (discussed hereafter) 250. In an embodiment, the full personal name face identifying information of the image is used in conjunction with a face database 140 to convert the full name into a shortened personal name. In FIG. 1, the example full personal name of Mary Lewis is converted to "Mary L." and the full personal name of John Lewis is converted to "John L." 125 through a simple look-up via the face database. Similarly, other face identifying information could be associated with or converted to relevant face data. However, face identifying information conversion using a face database is not required from time to time or at all if the face identifying information is sufficient for use with the sharing rule(s) 240.

The face identifying information, whether in its original form or in the form of relevant face data, is then applied 270 to one or more sharing rules 140, if any are applicable 260, to determine to which one or more recipients an image should be made available. For example, a sharing rule may define that all images of Mary L. should be shared with a particular recipient (e.g. Mary L.) or group(s) of recipients. Referring to FIG. 1, face identifying information in the form of face data Mary L. and John L. is applied to two sharing rules, namely "Share images of Linda with Mary L." and "Share images of Mary L. with Mary L." Since the face identifying information only satisfies the rule "Share images of Mary L. with Mary L.", the image related to the face identifying information is only made available to Mary L, subject to any other rules or conditions discussed hereafter. The face identifying information related to John L. is ignored for application to the sharing rule(s) but that face identifying information (or that of the image of Mary L.) may be useful to a face image and/or information database for use with face recognition techniques i.e. John L. (or Mary L.) may have been identified manually in the image and the image and/or image information along with the face identifying information may be added to a face and/or image information database used by an implemented face recognition feature.

As will be apparent to those skilled in the art, any number of conditions, whether face based or not, could be implemented into a sharing rule e.g. sharing only images taken between dates X and Y, sharing only video images, etc. A sharing rule could also, for example, specify a set of face identifying information (e.g. images taken of John L. and Mary L.), specify a range of face identifying information (e.g. images taken of the Lewis family), or specify one or more characteristics of a particular item or set of face identifying information (e.g. images taken of males in the Lewis family), whether in place of or in combination with specifying particular face identifying information such as a personal name. Additionally, other rules (including sharing rules) may be combined with one or more sharing rules to affect the results of the application of the sharing rule(s). For example, a rule may specify that images should only be shared with persons on a buddy list. As a result, the buddy list rule operating in conjunction with previous or subsequent sharing rules (or other rules) acts as a filter to limit the persons to whom images will be shared notwithstanding that the sharing rule(s) may allow for sharing of an image to a person not on the buddy list.

If one or more sharing rules are satisfied and one or more recipients are determined from the application of the face identifying information to the sharing (and other, if any) rule(s) 280, the image associated with the face identifying information is made available to each of the recipients specified by the sharing (and other, if any) rule(s) 140, 290 that is complied with. In an embodiment, sending information for the recipient(s) e.g. e-mail addresses is determined and then the image, along with perhaps other images determined to be sent to the recipient, is sent electronically by e-mail to each of the recipient(s) specified by the sharing rule(s) that is complied with and for which sending information is available. Such sending of e-mails may be automatic (in that the e-mail is generated and sent to the recipient(s) without significant or any user intervention) or manual and optionally, the user may be offered the choice to decline sending the image to one or more of the determined recipients. Alternatively, a link to the image on a Web site could be sent instead of the image itself. The image (or link) could also be sent by other electronic transmission means such as instant messaging. As will be apparent to those skilled in the art, the image may also simply be made available on a portion of a Web site designated for the recipient and which the recipient may access.

The image is captured in or loaded into a computer system that comprises a user computer that is preferably connected to a network of computers including computers of recipients and is processed by the computer system according to the sharing functionality described herein. The term computer here is considered in its broadest sense as some device with computing capabilities such as traditional personal computers, cellular phones, handheld computers (PDAs), and even cameras themselves. As will be apparent to those skilled in the art, all the computing functionality described above may be incorporated into the camera itself and a connection to a network is simply made by a phone line or other network connection.

Figure 3:
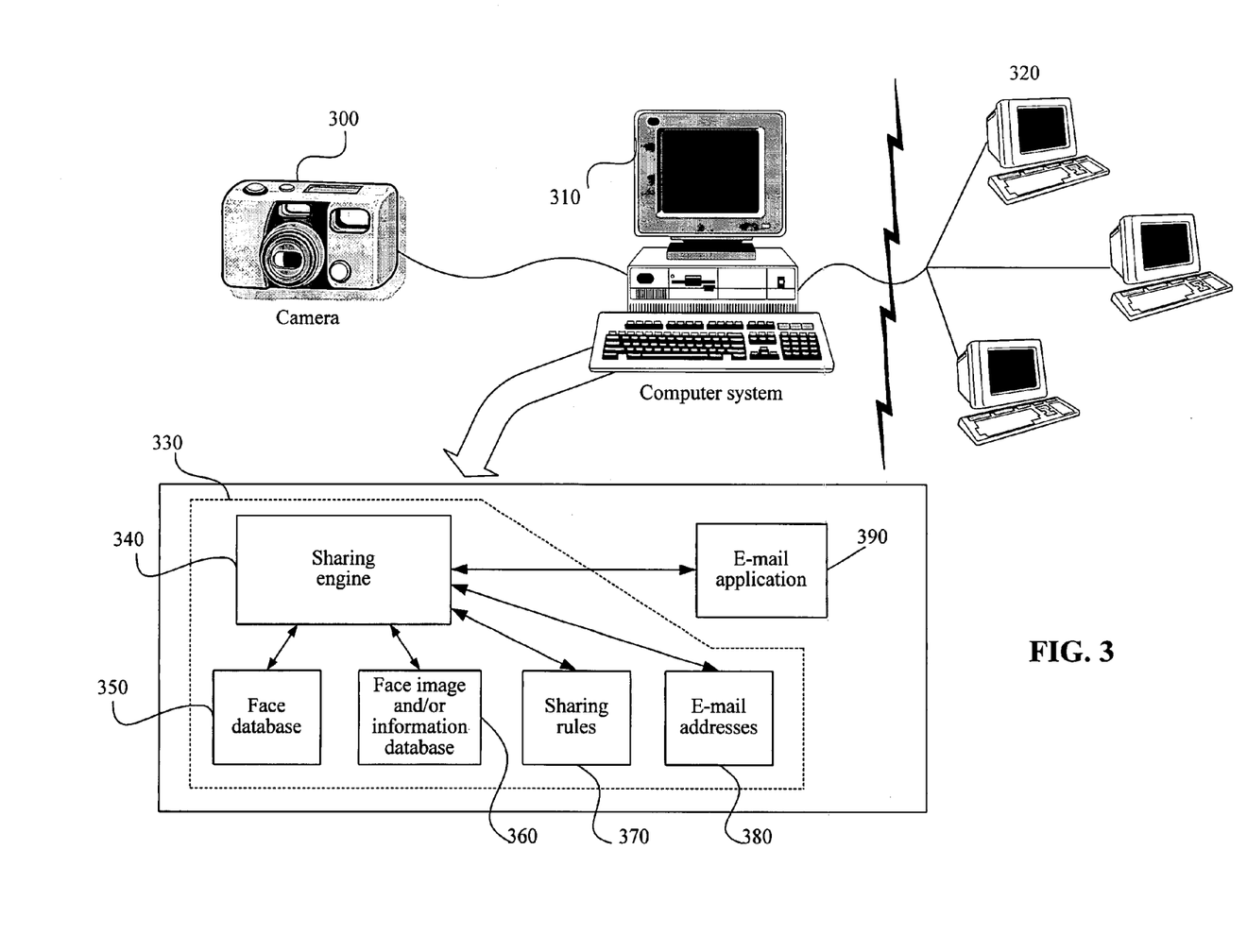
FIG. 3 is a schematic of the hardware and software architecture of an embodiment of the invention.

Referring to FIG. 3, a schematic of the hardware and software architecture of an embodiment of the invention is presented. In the embodiment, the above-described sharing functionality is implemented as a software program 330 for operation on a computer system 310. The computer system itself comprises one or more connections to a network of computers 320 including computers of recipients and connected to the computer system is a digital camera 300 to capture and provide the image to the computer system. All such connections may be wired or wireless. The software program receives the image from the digital camera via the computer system.

Once the image is received, the image is processed by the sharing engine 340 of the software using face recognition techniques in conjunction with a face image and/or information database 360 to determine face identifying information for the image. If the face identifying information is not in a format suitable for the applicable sharing rule(s), the face identifying information is used in conjunction with a face database 350 to convert the face identifying information into or associate it with face data such as a full or shortened personal name for application to one or more sharing rules 370. The sharing engine then applies the sharing rules, configured in the software program by a user, to the image and associated face identifying information (whether in its original form and/or as face data) to determine intended recipients. The e-mail addresses of intended recipients, if any, are retrieved from a database of e-mail addresses 380 maintained for intended recipients. Then, for each intended recipient resulting from the successful application of one or more sharing rules, e-mails with the image attached are created within and sent by an associated sending unit 390 such as an e-mail application using the retrieved e-mail addresses.

As will be apparent to those skilled in the art, a great number of variations to the above-described hardware and software architecture are possible and within the scope of the invention. For example, any or all the various software components described (such as the sharing engine, the sending unit, etc.) can be integrated into one program, further divided into components or differently packaged together. The face database could be integrated into the software program. The sharing engine may be divided into a face database component and a sharing rule processing component. The e-mail address database may be a part of the e-mail application. A further variation is that camera need not be the exclusive or actual source of the image or be involved with associating the face identifying information with the image. Optionally, the image could be received by the program from the network via e-mail, the Internet, etc. Also, the face identifying information may be associated with the image inside the software program instead of or in addition to by the camera. Furthermore, the specific software and hardware architecture described above should not be considered limiting of the invention because, for example, the software and hardware could be completely integrated into one system or differently arranged and/or some or all of the software functionality could be implemented as hardware or vice versa.

The detailed descriptions may have been presented in terms of program procedures executed on a computer or network of computers. These procedural descriptions and representations are the means used by those skilled in the art to most effectively convey the substance of their work to others skilled in the art. The embodiments of the invention may be implemented as apparent to those skilled in the art in hardware or software, or any combination thereof. The actual software code or hardware used to implement the invention is not limiting of the invention. Thus, the operation and behavior of the embodiments often will be described without specific reference to the actual software code or hardware components. The absence of such specific references is feasible because it is clearly understood that artisans of ordinary skill would be able to design software and hardware to implement the embodiments of the invention based on the description herein with only a reasonable effort and without undue experimentation.

A procedure is here, and generally, conceived to be a self-consistent sequence of operations leading to a desired result. These operations comprise physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations of the invention described herein; the operations are machine operations. Useful machines for performing the operations of the invention include general purpose digital computers, special purpose computers or similar devices.

Each operation of the method may be executed on any general computer, such as a mainframe computer, personal computer or the like and pursuant to one or more, or a part of one or more, program modules or objects generated from any programming language, such as C++, Java, Fortran, etc. And still further, each operation, or a file, module, object or the like implementing each operation, may be executed by special purpose hardware or a circuit module designed for that purpose. For example, the invention may be implemented as a firmware program loaded into non-volatile storage or a software program loaded from or into a data storage medium as machine-readable code, such code being instructions executable by an array of logic elements such as a processor or other digital signal processing unit. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on.

In the case of diagrams depicted herein, they are provided by way of example. There may be variations to these diagrams or the operations described herein without departing from the spirit of the invention. For instance, in certain cases, the operations may be performed in differing order, or operations may be added, deleted or modified.

An embodiment of the invention may be implemented as an article of manufacture comprising a computer usable medium having computer readable program code means therein for executing the method operations of the invention, a program storage device readable by a machine, tangibly embodying a program of instructions executable by a machine to perform the method operations of the invention, or a computer program product. Such an article of manufacture, program storage device or computer program product may include, but is not limited to, CD-ROM, CD-R, CD-RW, diskettes, tapes, hard drives, computer system memory (e.g. RAM or ROM), and/or the electronic, magnetic, optical, biological or other similar embodiment of the program (including, but not limited to, a carrier wave modulated, or otherwise manipulated, to convey instructions that can be read, demodulated/decoded and executed by a computer). Indeed, the article of manufacture, program storage device or computer program product may include any solid or fluid transmission medium, whether magnetic, biological, optical, or the like, for storing or transmitting signals readable by a machine for controlling the operation of a general or special purpose computer according to the method of the invention and/or to structure its components in accordance with a system of the invention.

An embodiment of the invention may also be implemented in a system. A system may comprise a computer that includes a processor and a memory device and optionally, a storage device, an output device such as a video display and/or an input device such as a keyboard or computer mouse. Moreover, a system may comprise an interconnected network of computers. Computers may equally be in stand-alone form (such as the traditional desktop personal computer) or integrated into another apparatus (such as a cellular telephone).

The system may be specially constructed for the required purposes to perform, for example, the method of the invention or it may comprise one or more general purpose computers as selectively activated or reconfigured by a computer program in accordance with the teachings herein stored in the computer(s). The system could also be implemented in whole or in part as a hard-wired circuit or as a circuit configuration fabricated into an application-specific integrated circuit. The invention presented herein is not inherently related to a particular computer system or other apparatus. The required structure for a variety of these systems will appear from the description given.

While this invention has been described in relation to certain embodiments, it will be understood by those skilled in the art that other embodiments according to the generic principles disclosed herein, modifications to the disclosed embodiments and changes in the details of construction, arrangement of parts, compositions, processes, structures and materials selection all may be made without departing from the spirit and scope of the invention Changes, including equivalent structures, acts, materials, etc., may be made, within the purview of the appended claims, without departing from the scope and spirit of the invention in its aspects. Thus, it should be understood that the above described embodiments have been provided by way of example rather than as a limitation of the invention and that the specification and drawing(s) are, accordingly, to be regarded in an illustrative rather than a restrictive sense. As such, the invention is not intended to be limited to the embodiments shown above but rather is to be accorded the widest scope consistent with the principles and novel features disclosed in any fashion herein.

What is claimed is:

1. A computer implemented method for location-based image sharing, comprising:

defining a sharing rule to be used by a sharing engine executing on a first computing node on a network having a plurality of computing nodes, the sharing rule to specify one or more recipients with whom an image should be shared based on location-identifying information, the location-identifying information associated with a physical location of subjects and objects captured by the image, wherein the image is associated with image related location-identifying information and stored in a memory store communicatively coupled to the first computing node on the network, and wherein the sharing rule is stored in the memory store;

determining by a sharing engine executing on the first computing node, the one or more recipients with whom the image should be shared by applying the image related location-identifying information associated with the image to the sharing rule sending a notification that the image is available to the determined one or more recipients on their respective computing nodes connected to the network.

2. The method of claim 1, further comprising:
responsive to the determining, automatically making the image available to the determined one or more recipients.

3. The method of claim 2, wherein making the image available comprises:
responsive to the determining by the sharing engine, either (a) automatically sending an electronic copy of the image to the determined one or more recipients by e-mail, or (b) automatically sending a link to the image on a Web site to the determined one or more recipients.

4. The method of claim 1, further comprising converting the location-identifying information into location data using a location database.

5. The method of claim 1 wherein the location identifying information comprises latitude and longitude coordinates.

6. The method of claim 1 wherein the image is at least one of a digital photo and a digital video.

7. The method of claim 1 wherein the sharing rule specifies at least one of a proximity to the location-identifying information, a set of location-identifying information and a bounding perimeter of location-identifying information.

8. The method of claim 1 wherein the sharing rule comprises a rule that images are only to be shared with the one or more recipients that are on a buddy list.

9. A system for location-based image sharing, comprising:
a plurality of computing nodes communicatively connected by a communication network;

a first computing node having a processor communicatively coupled to a memory store;

a sharing rule residing in the memory store, defining one or more recipients with whom an image should be shared based on location-identifying information, the location-identifying information associated with a physical location of subjects and objects captured by the images, and wherein the image is associated with image related location-identifying information; and a sharing engine executing on the processor to apply the related location-identifying information to the sharing rule to determine the one or more recipients with whom the image should be shared, wherein the sharing engine is configured to send a notification to the one or more recipients with whom the image should be shared, as determined by the sharing engine, the notification to be sent over the communication network and to be received by the one or more recipients' computing nodes.

10. The system of claim 9, further comprising:

a sending unit coupled to the first computing node configured to make the image automatically available to the determined one or more recipients.

11. The system of claim 10, wherein the sending unit is adapted to either automatically send a copy of the image to the determined one or more recipients' computing nodes by e-mail or automatically send a link to the image on a Web site to the determined one or more recipients' computing nodes.

12. The system of claim 9, wherein the sharing engine is further adapted to convert the location-identifying information into location data using a location database stored in the memory store.

13. The system of claim 9 wherein the location-identifying information comprises latitude and longitude coordinates.

14. The system of claim 9 wherein the image is at least one of a digital photo and a digital video.

15. The system of claim 9 wherein the sharing rule specifies at least one of a proximity to the location-identifying information, a set of location-identifying information and a bounding perimeter of location-identifying information.

16. The system of claim 9 wherein the sharing rule comprises a rule that images are only to be shared with the one or more recipients that are on a buddy list.

17. A computer readable storage medium having computer program code stored thereon, the code when executed on a processor to cause the processor to perform a method of sharing an image having related location-identifying information, the method comprising:

determining a recipient of the image based upon the location-identifying information, the location-identifying information associated with a physical location of subjects and objects captured by the image, wherein the image and related location-identifying information are stored in a memory store communicatively coupled to a first computing node on a network, and wherein the recipient is connected to a second computing node on the network; and responsive to the determining making the image available to the recipient at the second computing node.

18. The medium of claim 17, wherein making the image available comprises either (a) automatically sending a copy of the image to the determined one or more recipients by e-mail or (b) automatically sending a link to the image on a Web site to the determined one or more recipients.

19. The medium of claim 17, wherein the method further comprises converting the location-identifying information into location data using a location database.

20. The medium of claim 17 wherein the location-identifying information comprises latitude and longitude coordinates.

21. The medium of claim 17 wherein the image is at least one of a digital photo and a digital video.

22. The medium of claim 17 wherein the sharing rule specifies at least one of a proximity to the location-identifying information, a set of location-identifying information and a bounding perimeter of location-identifying information.

23. A computer implemented method of sharing an image having related location-identifying information, comprising:

determining a recipient of the image based upon the location-identifying information, the location-identifying information associated with a physical location of the image subjects, wherein the image and related location-identifying information are stored in a memory store communicatively coupled to a first computing node on a network, and wherein the recipient is connected to a second computing node on the network; and responsive to the determining, making the image available to the recipient at the second computing node.

24. The method of claim 23, wherein making the image available comprises at least one of (a) automatically sending an electronic copy of the image to the recipient by e-mail and (b) automatically sending a link to the image on a Web site to the recipient.

25. The method of claim 23, further comprising converting the location-identifying information into location data using a location database.

26. The method of claim 23, wherein the location-identifying information comprises latitude and longitude coordinates.

27. The method of claim 23, wherein the image is at least one of a digital photo and a digital video.

28. The method of claim 23, wherein determining a recipient of the image is performed using at least one of a proximity to the location-identifying information, a set of location-identifying information and a bounding perimeter of location-identifying information.

29. The method of claim 23, wherein making the image available to the recipient comprises making the image available to the recipient only if the recipient is within a predetermined subset of possible recipients.

30. A computer readable storage medium having instructions stored thereon, the instructions when executed by a processor of a first computing node on a network, cause the processor to:

receive an image and location-identifying information associated with the image, the location-identifying information also being associated with a physical location of subjects and objects captured by the image;

retrieve a sharing rule from a memory store coupled to the processor, the sharing rule specifying one or more recipients with whom an image may be shared based on associating permitted locations for each possible recipient, wherein the permitted locations are derived from location-identifying information stored in a location database, the location-identifying information associated with each possible recipient;

determine one or more recipients with whom the received image should be shared by applying the sharing rule to the location-identifying information associated with the image; and sending a notification that the image is available to the determined one or more recipients.

31. The medium as recited in claim 30, further comprising instructions to:
  responsive to the determining, automatically make the image available to the determined one or more recipients.

32. The medium as recited in claim 31, wherein making the image available comprises instructions to:
  responsive to the determining, either (a) automatically sending an electronic copy of the image to the determined one or more recipients by e-mail, or (b) automatically sending a link to the image to the determined one or more recipients, wherein the link enables navigation to the image accessible via a Web site.

33. The medium as recited in claim 30, further comprising instructions to:
  convert the location-identifying information associated with the image into location data using a location database.

34. The medium as recited in claim 30, wherein the location-identifying information comprises latitude and longitude coordinates.

35. The medium as recited in claim 30 wherein the image is at least one of a digital photo and a digital video.

36. The medium as recited in claim 30, wherein the sharing rule specifies at least one of a proximity to the location-identifying information, a set of location-identifying information and a bounding perimeter of location-identifying information.

37. The medium as recited in claim 30, wherein the sharing rule comprises a rule that images are only to be shared with the one or more recipients that are in a pre-determined subset of possible recipients.

* * * * *